(12) United States Patent
Asakawa

(10) Patent No.: US 6,830,327 B2
(45) Date of Patent: Dec. 14, 2004

(54) SECURE INK-JET PRINTING FOR VERIFICATION OF AN ORIGINAL DOCUMENT

(75) Inventor: Stuart D Asakawa, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/016,154

(22) Filed: Oct. 22, 2001

(65) Prior Publication Data

US 2003/0076372 A1 Apr. 24, 2003

(51) Int. Cl.[7] .................................................. B41J 2/01
(52) U.S. Cl. ...................................... 347/100; 347/107
(58) Field of Search ......................... 347/95, 100, 107; 106/31.13–31.92

(56) References Cited

U.S. PATENT DOCUMENTS

| | | | | |
|---|---|---|---|---|
| 5,085,698 A | * | 2/1992 | Ma et al. ..................... | 524/388 |
| 5,087,507 A | | 2/1992 | Heinzer | |
| 5,171,363 A | * | 12/1992 | Phillips et al. ................ | 106/22 |
| 5,291,243 A | | 3/1994 | Heckman et al. | |
| 5,398,131 A | * | 3/1995 | Hall et al. .................... | 359/465 |
| 5,445,671 A | * | 8/1995 | Herget et al. ................. | 106/20 |
| 5,570,205 A | * | 10/1996 | Sugita et al. ................ | 358/472 |
| 5,573,584 A | * | 11/1996 | Ostertag et al. ............ | 106/417 |
| 5,679,138 A | * | 10/1997 | Bishop et al. ................ | 106/20 |
| 5,699,091 A | | 12/1997 | Bullock et al. ............... | 347/19 |
| 5,742,306 A | * | 4/1998 | Gompertz et al. ............ | 347/43 |
| 5,779,777 A | * | 7/1998 | Okuda et al. ............ | 106/31.26 |
| 5,812,156 A | | 9/1998 | Bullock et al. ............... | 347/19 |
| 5,835,817 A | | 11/1998 | Bullock et al. ............... | 347/19 |
| 5,855,660 A | * | 1/1999 | Bujard et al. ................ | 106/418 |
| 5,930,553 A | | 7/1999 | Hirst et al. .................... | 399/8 |
| 6,019,449 A | | 2/2000 | Bullock et al. ............... | 347/14 |
| 6,039,430 A | | 3/2000 | Helterline et al. ........... | 347/19 |
| 6,065,824 A | | 5/2000 | Bullock et al. ............... | 347/19 |
| 6,089,687 A | | 7/2000 | Helterline ...................... | 347/7 |
| 6,102,508 A | | 8/2000 | Cowger ......................... | 347/7 |
| 6,113,208 A | | 9/2000 | Benjamin et al. ............. | 347/7 |
| 6,126,265 A | | 10/2000 | Childers et al. .............. | 347/23 |
| 6,161,913 A | | 12/2000 | Childers et al. .............. | 347/19 |
| 6,303,213 B1 | | 10/2001 | Berneth et al. | |

FOREIGN PATENT DOCUMENTS

| | | |
|---|---|---|
| DE | 2 429 292 | 3/1980 |
| DE | 29821242 U1 | 5/1999 |
| DE | 19953655 A1 | 5/2001 |
| EP | 0657297 A1 | 6/1995 |
| EP | 0913432 A1 | 5/1999 |

* cited by examiner

*Primary Examiner*—Lamson Nguyen
*Assistant Examiner*—Blaise Mouttet

(57) ABSTRACT

The present invention provides ink-jet inks, systems, and methods for marking documents as original. Specifically, an aqueous ink-jet ink can comprise an ink vehicle; and a sufficient amount of particulates having directionally dependent light reflective properties within the ink vehicle such that when the ink-jet ink is substantially dried on a desired substrate, a multi-colored reflected light is emittable in the presence of a light source. Printing documents as original can be carried out for compensation, as a service, or by providing cartridges containing these inks to clients and/or customers.

18 Claims, No Drawings

SECURE INK-JET PRINTING FOR VERIFICATION OF AN ORIGINAL DOCUMENT

FIELD OF THE INVENTION

The present invention is drawn to ink-jet inks, systems, and methods for secure ink-jet printing on documents.

BACKGROUND OF THE INVENTION

In recent years, computer printer technology has evolved to a point where very high-resolution images can be transferred to various types of media, including paper. One particular type of printing involves the placement of small drops of a fluid ink onto a media surface in response to a digital signal. Typically, the fluid ink is placed or jetted onto the surface without physical contact between the printing device and the surface. Within this general technique, the specific method that the ink-jet ink is deposited onto the printing surface varies from system to system, and can include continuous ink deposit and drop-on-demand ink deposit.

With regard to continuous printing systems, inks used are typically based on solvents such as methyl ethyl ketone and ethanol. Essentially, continuous printing systems function as a stream of ink droplets are ejected and directed by a printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink-jet inks are typically based upon water and glycols. Essentially, with these systems, ink droplets are propelled from a nozzle by heat or by a pressure wave such that all of the ink droplets ejected are used to form the printed image.

There are several reasons that ink-jet printing has become a popular way of recording images on various media surfaces, particularly paper. Some of these reasons include low printer noise, capability of high speed recording, and multi-color recording. Additionally, these advantages can be obtained at a relatively low price to consumers. However, though there has been great improvement in ink-jet printing, accompanying this improvement are increased demands by consumers in this area, e.g., higher speeds, higher resolution, full color image formation, increased stability, new applications, etc. As new ink-jet inks are developed, there have been several traditional characteristics to consider when evaluating the ink in conjunction with a printing surface or substrate. Such characteristics include edge acuity and optical density of the image on the surface, dry time of the ink on the substrate, adhesion to the substrate, lack of deviation of ink droplets, presence of all dots, resistance of the ink after drying to water and other solvents, long term storage stability, and long term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

In general, ink-jet inks are either dye- or pigment-based inks. Dye-based ink-jet inks generally use a soluble colorant that is usually water-based to turn the media a specific color. Alternatively, pigmented inks typically use a dispersed colorant to achieve color. In many cases, the line quality and accuracy of plots produced by pigment-based inks can be superior to that of dye-based inks. However, certain challenges exist with pigments because the colorant is present as a dispersion. With pigmented inks, solid particles are jetted with a vehicle and the solid particles adhere to the surface of the substrate. Once the water in the solution has evaporated, the particles will generally not redisperse, thereby producing a dried image.

Documents having a need to be marked as official or original, such as identity cards, passports, banknotes, checks, bonds, and the like have become an important part of business. Particularly, in light of new technological advances, more and more interest in marking documents as original has followed. In the prior art, methods using items such as threads, fibers, colored elements, metallized elements, magnetized elements, or filigranes have been provided with reasonable success. Specifically, some of the methods of the prior art used to prevent copyability of documents include papers coated with a cacao-colored layer, the use of special inks printed on a masking background, colored films coated on semi-transparent vacuum-metallized films, and security papers based on dark pigments covering the sensitivity spectrum of modern photocopiers. However, in this area, there is a need for additional technologies that provide similar results, while at the same time provide people at the consumer level to easily and readily have access to original document marking technology using relatively simple equipment.

SUMMARY OF THE INVENTION

It would be desirable to provide inks, particularly for use in ink-jet ink printers, that are useful for providing visible, non-copyable markings on documents to denote that they are original documents. It would also be desirable if these and other inks could be used as part of systems and methods related to the area of original document marking.

With this in mind, a specialty ink-jet ink can comprise an ink vehicle; and a sufficient amount of particulates having directionally dependent light reflective properties within the ink vehicle such that when the ink-jet ink is substantially dried on a desired substrate, a multi-colored reflected light is emittable in the presence of a light source. Additionally, an aqueous ink-jet ink printing system can comprise a specialty ink-jet ink having an effective amount of particulates contained therein, wherein the particulates have directionally dependent light reflective properties; and a specialty ink-jet ink pen configured for jetting the ink-jet ink.

Several methods can also be implemented using the inks of the present invention, as well as other inks that impart non-copyable properties. For example, a method for marking a document as an original can comprise the steps of providing an image-containing document that is to be marked as an original; and ink-jetting a visible mark onto the document, wherein the visible mark has a non-copyable property. Alternatively, a method of generating revenue can comprise providing a specialty ink-jet ink pen for use in a printer, wherein the specialty ink-jet pen is capable of printing a visible mark on a substrate, and wherein the visible mark has a property that is non-copyable; and limiting the number of substrates that can be printed with the specialty ink-jet ink pen in accordance with an amount of consideration paid by the customer. Further, a method of providing clients with original document marking services can comprise obtaining a document on which a client wishes to have marked as original; and printing a visible mark on the document, wherein the visible mark is non-copyable. The non-copyable visible mark preferably exhibits directionally dependent light reflective properties.

DETAILED DESCRIPTION OF THE INVENTION

For the purposes of promoting an understanding of the principles of the invention, reference will now be made to the exemplary embodiments, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The singular forms "a," "an," and, "the" include plural referents unless the context clearly dictates otherwise. Thus, for example, reference to "an ink" includes reference to one or more of such inks.

As used herein, "sufficient amount" or "effective amount" refers to the minimal amount of a substance or agent, which is present in high enough quantities or concentration to achieve a desired effect. For example, an effective amount of an "ink vehicle" is the minimum amount required in order to create an ink that will meet functional performance and characteristic standards. Alternatively, a sufficient amount of reflective particulates is an amount that will provide a visible non-copyable property.

As used herein, "ink vehicle," refers to the vehicle in which the particulates are suspended or dispersed to form an ink. Ink vehicles are well known in the art, and a wide variety of ink vehicles may be used with the ink composition of the present invention. Such ink vehicles may include a mixture of a variety of different agents, including without limitation, solvents, co-solvents, buffers, biocides, viscosity modifiers, surface-active agents, and water.

"Non-copyable" shall mean that upon conventional copying techniques such as photocopying, scanning and reprinting, color-copying, and the like, a given property cannot be copied and impart the same property in substantially the same way. For example, if a marking or image has a property that reflects multi-colored light or has a directionally dependent light reflective property, upon color-copying, the copied marking or image will not impart the same property. Even if the image is scanned and printed using the same printer pen and ink, the pattern of the reflected light within the copy will inevitably be different as the exact pattern of reflective particulates will not be duplicated.

An aqueous ink-jet ink can comprise an ink vehicle; and a sufficient amount of particulates having directionally dependent light reflective properties within the ink vehicle such that when the ink-jet ink is substantially dried on a desired substrate, a multi-colored reflected light is emittable in the presence of a light source. In one embodiment, the particulates can be selected from the group consisting of pearlescent particulates, mica particulates, glitter particulates, coated silica composite particulates, coated plastic composite particulates, magnesium fluoride particulates, and combinations thereof.

Though particulates of any size can be used that are ink-jettable, for practical purposes, there are limits to the particulate size that should be used due to ink-jet pen bore size, resister size, ink viscosity limits, and other considerations that would be apparent to those skilled in the art. For example, reflective particulates can be used that range from about 0.01 to 100 microns. In one embodiment, from 2 to 20 microns can be used as an optical effect can be imparted due to the diffraction of light off of single particles and their spacing to one another. In another embodiment, it has also been discovered that sub-micron sized particulates can also impart a desired optical effect, e.g., 0.01 to 0.1. Though such a particulate size is very small, it was not expected that significant light reflection would occur within this range. As a result, it was surprising to discover that a non-copyable reflected light was emittable from inks containing particulates in this size range. Not being bound by any particular theory, such a multi-colored reflected light may be present due to diffraction effects between layers of these small particulates. Additionally, because the particulates are so small, there are fewer issues of clogging and other adverse printing problems to be addressed. Next, particulates that range in size from 20 to 100 microns have a very distinct ability to reflect light. With ink-jet inks having these larger particulates contained therein, ink-jet pens can preferably be used that have larger bore and resistor sizes to accommodate these larger sizes. Additionally, due to the large bore and resistor diameters, the ink-jet ink can be prepared at an increased viscosity. Alternatively, if it is undesirable to add a substantial amount of a viscosity enhancer to the ink vehicle, then the pen itself can be adjusted to provide more back pressure such that the ink-jet ink can jet from the larger diameter orifice appropriately.

Particulate shape can also play a role in the jetting ability of an ink-jet ink containing reflective particulates. For example, an irregular shaped particulate may be more inclined to cause clogging than a plate-like shaped particulate (as plate-like shaped particulates may slide past one another more predictably). This being said, preferred particulates can be shaped according to a general geometry selected from the group consisting of substantially spherical, substantially plate-like, substantially irregular, and substantially needle-like in shape.

Though any functional amount of particulates having directionally dependent light reflective properties can be used, in one embodiment, it is preferred that the particulates are present in the ink vehicle at from 1% to 10% by weight. Additionally, though not required, if the desire is to provide a color image, an effective amount of an ink colorant can be added. In fact, in one embodiment, the ink colorant can be a pigment having attached thereto a reflective particulate. In another embodiment, if a dye is used, the dye can be present in the ink-jet ink formulation at from about 0.1% to 5% by weight. Any dye used can be colored or black, depending on the application or desired use. Examples of dyes that can be used include, but are not limited to, Direct Blue 199, Direct Red 9, Direct Red 227, Acid Yellow 23, Direct Yellow 86, Direct Yellow 4 (BASF), Direct Yellow 50 (Zenceca Colors), Pacified Reactive Black 31, and other similar dyes. Thus, at least one of each color, i.e., cyan, magenta, and yellow, and black, ink-jet inks can be formulated for use.

Turning to a related invention, an aqueous ink-jet ink printing system can comprise a specialty ink-jet ink having an effective amount of particulates having directionally dependent light reflective properties contained therein; and a specialty ink-jet ink pen configured for jetting the ink-jet ink. The specialty ink-jet ink pen can be configured for jetting the ink-jet ink by adjusting the bore size, resistor size, internal fluid barrier geometries, and/or back pressure, to name a few adjustments that can be made. In one embodiment, when printed on a substrate and in the presence of light, a multi-colored reflected light can be emitted. With respect to the present invention, the specialty ink-jet ink pen can be a thermal or piezo ink-jet ink pen. Further, a substrate can be present that is configured for accepting the jetted specialty ink-jet ink. The substrate can be paper or any other known substrate. However, the intensity of the multi-colored reflected light can be increased upon a second coating of the specialty ink-jet ink onto the printed substrate. Further, multiple passes, such as for example, 2 or more, can be practically used in accordance with the principles of the present invention.

When jetting particulates, such as pigments of the prior art, or the particulates used with the present invention, ink-jet bore size, resistor size, and internal fluid barrier geometries can be considered for obtaining improved results. For example, both the black (carbon) and color (organic) pigmented systems having particle sizes in the order of about 100 nanometers are routinely successfully jetted through ink-jet pens. Functional bore sizes for use include have included bore size to pigment ratios of about 280:1 or 240:1, for example. As mentioned, the shape of a particulate also has an impact on whether or not a nozzle or bore of an ink-jet pen will clog, and thus, the shape should be considered when determining a bore size to particulate size ratio for use. For example, a needle-shaped pigment may be more likely to clog a nozzle than, for example, a plate-like pigment. If the particle is plate-like, then a pigment to bore size ratio can approach ratios closer to about 8:1 because of the ability of one pigment particulate to slide or pass over another.

Efforts to jet essentially spherical 5 micron luster particles through a 60 micron ink-jet ink nozzle was found to be achievable. For example, at this 12 to 1 nozzle to particulate size ratio, silica particles (as available from Kremer) were shown to be successful. However, other particulates were also functional for jetting. Pearlescent particulates having a needle-like irregular shape [Pearl Luster Chroma Violet (Kremer Pigments 50520)] were also successfully jetted from a similar ink-jet ink pen. With these particulates, a peak population of about 6 microns was used. Further, a cosmetic called SHIMMER DUST from Naturalistics was also tested. This particle was even easier to fire from a similar ink-jet ink nozzle due to the size distribution. These particulates were essentially symmetrical, though rough in shape.

If mica particulates are used, to illustrate some of the different types of mica particulates, the following is provided. A particulate having directionally dependent light reflective properties can include substances such as a pigment coated with a thin film. For example, a mica particulate can be coated with a thin layer of titanium dioxide. In this embodiment, interference colors can be formed by refraction and reflection of light on the titanium oxide layer due to its high refractive index. Additionally, double coating of a mica plate with a second layer (such as iron (III) oxide or chromium (III) oxide) can provide the particulate with a brilliant color property as well Larger particulates can provide a glitter effect and smaller particulates can provide more of a satin luster.

Particulates that are ejected from thermo ink-jet or piezo ink-jet generally should conform to the physics involved in the flow to and firing from a nozzle chamber. In a preferred embodiment, the flow to the firing chamber should provide the ability of the vehicle to suspend the particles desired for a desired optical effect, e.g., luster or glitter. If the particulate size is so large that Brownian motion cannot keep the particulates suspended indefinitely, then select ink-vehicle components or mechanical agitation methods can be used to resuspend the particulates and move them to the firing chamber. Alternatively, the particulates can be suspended more permanently by adding a charge to the particulates. For example, a surface-active agent, an anionic dispersant, or a non-ionic dispersant could be used to provide a more stable suspension. More specifically, in one embodiment, a surface-active agent can be covalently attached or grafted to the mica or silica particulates. Still further, the pH of the ink can be adjusted to effectuate a more stable suspension. It is not the purpose of the present invention to describe every method whereby particulates can be suspended, as any method of suspending these particulates that is functional can be implemented.

With the systems of the present invention, for best results, the ratio of particle size to bore size can be considered when formulating an ink composition. For example, an average particulate size in length to bore size in diameter can be from 1:8 to 1:300. In one embodiment, the bore size can be from 20 microns to 200 microns in diameter. Larger bore sizes can be used for larger particulates. A range of particulate size can be from 0.01 microns to 100 microns in length. In one embodiment, the particulate size can be from 2 to 20 microns in length, with a more preferred range of from 5 to 10 microns in length. In another embodiment, particulates can range in size from 20 microns to 100 microns in length, though ink-jet pens would have to preferably have larger bores and resistors to accommodate these larger pigment particulates. Additionally, due to the large bore and resistor diameters, the ink-jet ink would also preferably be prepared at an increased viscosity. In yet another embodiment, the particulates can range in size from 0.01 to 0.1 microns in length.

The system of the present invention can also comprise one or more standard ink-jet pen or other printing apparatus. For example, the system can comprise a standard ink-jet ink pen capable of printing black or colored images, wherein the specialty ink-jet ink pen rides along with the standard ink-jet pen, and wherein the specialty ink-jet ink pen is activated when the substrate is to be marked as an original. Alternatively, a set of standard ink-jet pens can be present, each containing one of magenta, yellow, cyan, and/or black ink. Still further, the standard ink-jet pens present can contain light magenta, light yellow, and/or light cyan as is known in the art.

A method for marking a document as an original can be implemented using the inks and systems of the present invention, or other mediums capable of visibly marking the document as an original. The method comprises the steps of providing an image-containing document that is to be marked as an original; and ink-jetting a visible mark onto the document, wherein the visible mark has a non-copyable property. In one embodiment, the non-copyable property is a directionally dependent light reflective property present in the visible mark when exposed to light. This can be accomplished by utilizing an ink-jet ink or a system as described previously, though this is not required.

The visible mark can be ink-jetted onto the document during a single pass of the document through a printer that also provides the image on the document. In other words, a substrate can be printed with the text or images to be present on the original document, and during the same pass of the substrate through the printer, the visible marking used to show that the document is an original can also be printed. Alternatively, the document can also be previously printed, and then marked with the visible mark that is non-copyable. The document to be marked as original can contain text images and/or pictorial images. Additionally, the visible mark used to mark the document as original can be text and/or pictorial.

Another method is disclosed that can utilize the ink-jet inks and systems of the present invention. Specifically, a method of generating revenue is disclosed comprising providing a specialty ink-jet ink pen for use in a printer, wherein the specialty ink-jet pen is capable of printing a visible mark on a substrate, and wherein the visible mark has a property that is non-copyable; and limiting the number of substrates that can be printed with the specialty ink-jet ink pen in accordance with an amount of consideration paid by the customer. Preferably, the consideration is money. The visible mark can contain reflective particulates, providing a directionally dependent light reflective property when printed on a substrate and exposed to light.

In one embodiment, an amount of money paid by the consumer can be a set amount based upon a per-document schedule. In another embodiment, the number of substrates that can be printed can set based upon the price of the specialty ink-jet ink pen. In yet another embodiment, the number of substrates that can be printed can be set as per an electronic purchase. Still another embodiment provides that the number of substrates that can be printed be set by a code sent electronically to the specialty ink-jet ink pen, preferably from a remote location. In another embodiment, the number of substrates that can be printed is limited by time constraints, e.g., per day payment, per week payment, etc.

In the present method, the printer can also be equipped with an electronic counter that regulates the number of documents that can be printed. For example, the electronic counter can be equipped for modification by electronic signal sent to the electronic counter. A chip can be used, such as the SmartChip™ from Hewlett-Packard, that acts as a gatekeeper, controlling the printers actions.

A method of providing clients with original document marking services is also provided comprising the steps of obtaining a document on which a client wishes to have marked as original; and printing a visible mark on the document, wherein the visible mark is non-copyable. Again, the visible mark can be printed by ink-jetting the visible mark onto the document. Additionally, the visible mark, when substantially dried on the document, can provide directionally dependent light reflective property.

EXAMPLES

The following examples illustrate the preferred embodiments of the invention that are presently best known. However, other embodiments can be practiced that are also within the scope of the present invention.

Example 1

Ink Vehicle

An ink-jet ink vehicle composition was prepared that can be used to suspend reflective particulates. The formulation of the ink-jet ink vehicle composition is provided below:

| | |
|---|---|
| 5% | LEG-1 |
| 5% | 2-Pyrolidinone |
| 7% | Tetraethylene Glycol |
| 0.16% | FS-62 (surfactant) |
| 0.8% | AOT (surfactant) |
| balance | deionized water |

Example 2

To the ink-jet ink vehicle of Example 1 was added about 5% by weight of fine mica particles (averaging about 5 microns in length). Using an ink-jet ink pen having a bore size of about 60 microns in diameter, the ink-jet ink was jetted with reasonable reliability.

Example 3

To the ink-jet ink vehicle of Example 1 was added about 5% by weight of mica particles (from about 25 to 35 microns in length). Specifically, using an ink-jet ink pen having a bore size of about 200 microns in diameter, the ink-jet ink was jetted with reasonable reliability. Because of the large bore size, the pen was adjusted to increase the back pressure on the ink-jet ink.

Example 4

To the ink-jet ink vehicle of Example 1 was added about 5% by weight of fine mica particles (from about 0.05 to 0.1 microns in length). Using an ink-jet ink pen having a bore size of about 60 microns in diameter, the ink-jet ink was jetted with reasonable reliability.

Example 5

To the ink-jet ink vehicle of Example 1 was added about 5% by weight of fine silica particles (averaging about 5 microns in length). Using an ink-jet ink pen having a bore size of about 60 microns in diameter, the ink-jet ink was jetted with reasonable reliability.

Example 6

To the ink-jet ink vehicle of Example 1 was added about 5% by weight of fine pearlescent particles (averaging about 5 microns in length). Using an ink-jet ink pen having a bore size of about 60 microns in diameter, the ink-jet ink was jetted with reasonable reliability.

Example 7

To the ink jet-ink of Example 2 was added about 2% by weight of a dye. No noticeable difference as to jetability was noticed.

While the invention has been described with reference to certain preferred embodiments, those skilled in the art will appreciate that various modifications, changes, omissions, and substitutions can be made without departing from the spirit of the invention. For example, though a specific vehicle is shown in the Examples, other vehicles can also be used. It is intended, therefore, that the invention be limited only by the scope of the following claims.

What is claimed is:

1. An aqueous ink-jet ink printing system, comprising:
a specialty ink-jet ink comprising an ink vehicle having dispersed therein an effective amount of particulates, said particulates having directionally dependent light reflective properties, and wherein the ink-jet ink is ink jettable and said particulates are selected from the group consisting of pearlescent particulates, mica particulates, glitter particulates, coated silica composite particulates, coated plastic composite particulates, magnesium fluoride particulates, and combinations thereof;
a specialty ink-jet ink pen configured for jetting the ink-jet ink; and
a substrate configured for accepting the jetted specialty ink-jet ink, and an intensity of the directionally dependent light reflective properties is increased upon a second coating of the specialty ink-jet ink printed onto the printed substrate.

2. A system as in claim 1 wherein the particulates, when printed on the substrate and in the presence of light, emit multi-colored reflected light.

3. A system as in claim 1 wherein the average particulate size in length to bore size in diameter is from 1:8 to 1:300.

4. A system as in claim 1 wherein the ink-jet ink pen has a bore size from 20 microns to 200 microns in diameter.

5. A system as in claim 1 wherein the particulate size is from 0.01 microns to 100 microns in length.

6. A system as in claim 1 wherein the particulates are shaped according to a general geometry selected from the group consisting of substantially spherical, substantially plate-like, substantially irregular, and substantially needle-like.

7. A system as in claim 1 wherein the particulates range in size from 5 microns to 10 microns in length.

8. A system as in claim 1 wherein the particulates range in size from 0.01 to 0.1 microns in length.

9. An aqueous ink-jet ink printing system, comprising:

a specialty ink-jet ink comprising an ink vehicle having dispersed therein an effective amount of particulates, said particulates having directionally dependent light reflective properties, and wherein the ink-jet ink is ink jettable and said particulates are selected from the group consisting of pearlescent particulates, mica particulates, glitter particulates, coated silica composite particulates, coated plastic composite particulates, magnesium fluoride particulates, and combinations thereof;

a specialty ink-jet ink pen configured for jetting the ink-jet ink;

a substrate configured for accepting the jetted specialty ink-jet ink; and a standard ink-jet ink pen capable of printing black or colored images, wherein the specialty ink-jet ink pen rides along with the standard ink-jet pen, and wherein the specialty ink-jet ink pen is activated when the substrate is to be marked as an original.

10. A system as in claim 9 wherein the particulates, when printed on the substrate and in the presence of light, emit multi-colored reflected light.

11. A system as in claim 9 wherein the average particulate size in length to bore size in diameter is from 1:8 to 1:300.

12. A system as in claim 9 wherein the particulate size is from 0.01 microns to 100 microns in length.

13. A system as in claim 9 further comprising a plurality of standard ink-jet ink pens each capable of printing black or colored images, wherein the specialty ink-jet ink pen rides along with the plurality of standard ink-jet pens.

14. A system as in claim 1 wherein pigment solids are attached to the particulates.

15. A system as in claim 9 wherein the particulates are shaped according to a general geometry selected from the group consisting of substantially spherical, substantially plate-like, substantially irregular, and substantially needle-like.

16. A system as in claim 9 wherein the particulates range in size from 5 microns to 10 microns in length.

17. A system as in claim 9 wherein the particulates range in size from 0.01 to 0.1 microns in length.

18. A system as in claim 9 wherein pigment solids are attached to the particulates.

* * * * *